J. W. DEARBORN.
FRICTION CLUTCH.
APPLICATION FILED JUNE 27, 1910.
981,389.
Patented Jan. 10, 1911.
3 SHEETS—SHEET 1.
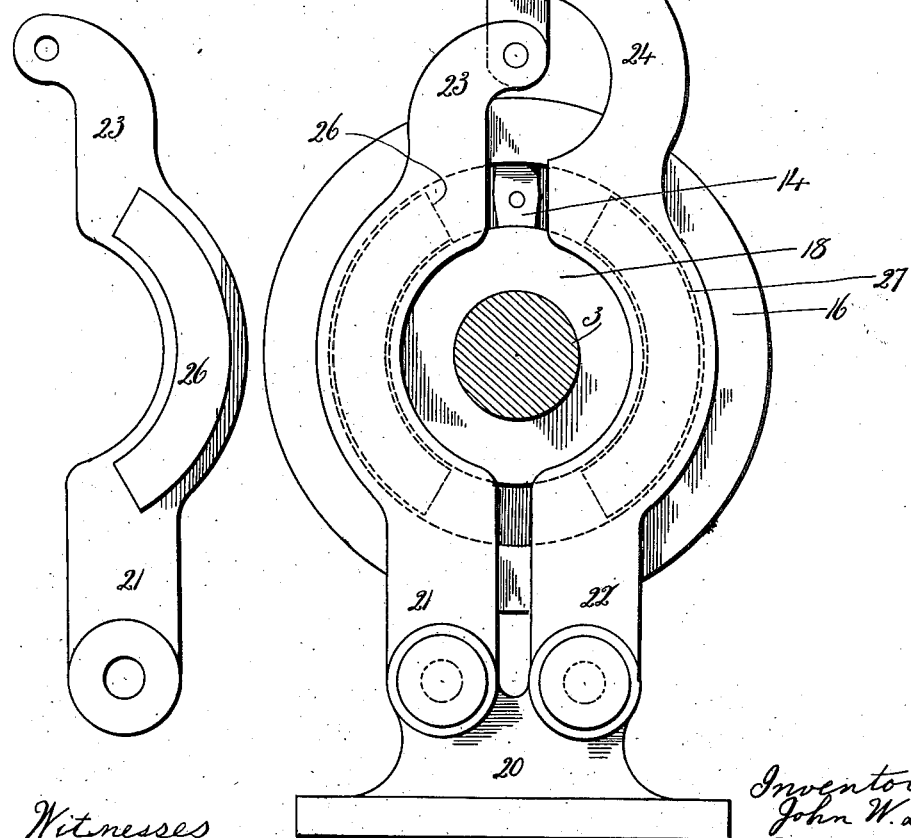

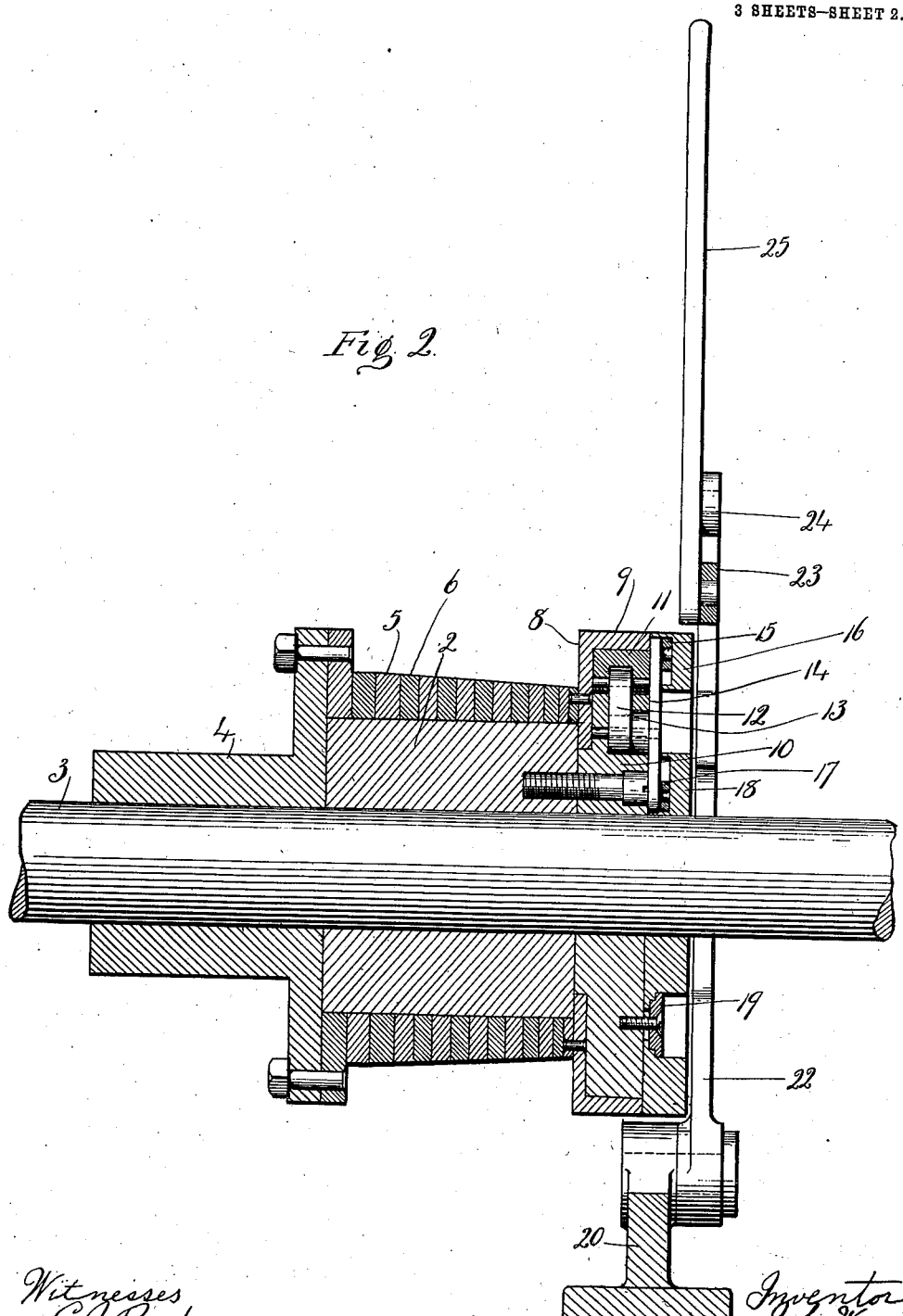

J. W. DEARBORN.
FRICTION CLUTCH.
APPLICATION FILED JUNE 27, 1910.
981,389.
Patented Jan. 10, 1911.
3 SHEETS—SHEET 3.
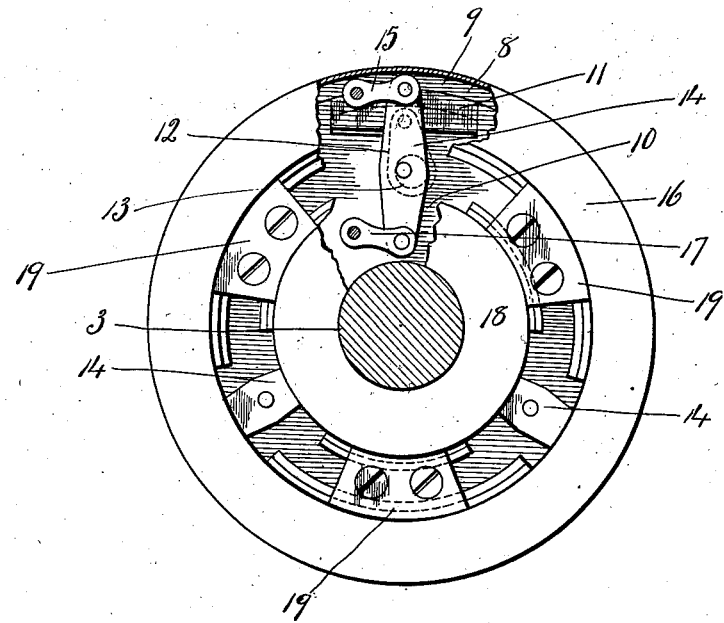
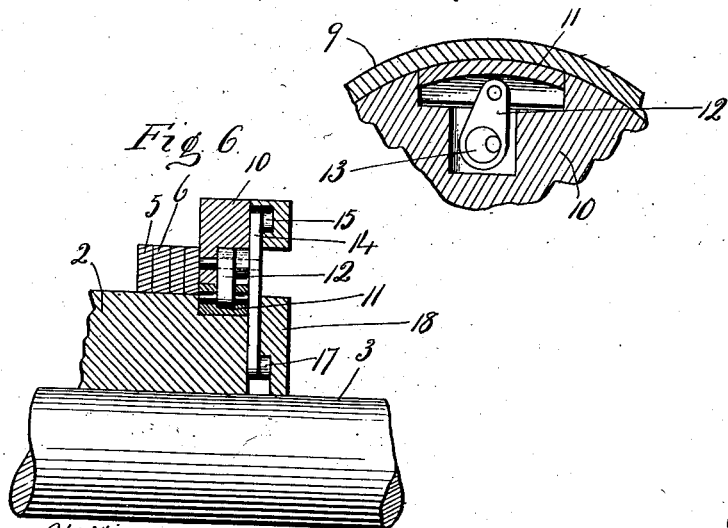
Witnesses
C. J. Reed.
C. L. Weed.
Inventor
John W. Dearborn
By Atty's
Seymour Earle

UNITED STATES PATENT OFFICE.

JOHN W. DEARBORN, OF ANSONIA, CONNECTICUT.

FRICTION-CLUTCH.

981,389.

Specification of Letters Patent.

Patented Jan. 10, 1911.

Application filed June 27, 1910. Serial No. 569,039.

*To all whom it may concern:*

Be it known that I, JOHN W. DEARBORN, a citizen of the United States, residing at Ansonia, in the county of New Haven and State of Connecticut, have invented a new and useful Improvement in Friction-Clutches; and I do hereby declare the following, when taken in connection with the accompanying drawings and the letters of reference marked thereon, to be a full, clear, and exact description of the same, and which said drawings constitute part of this specification, and represent, in—

Figure 1 a front view of a friction clutch constructed in accordance with my invention. Fig. 2 a vertical sectional view of the same. Fig. 3 an inside plan view of one of the operating levers, detached. Fig. 4 a face view partially broken away of my improved clutch with the operating levers removed. Fig. 5 a broken sectional view showing one of the operating shoes and its connection with its operating lever. Fig. 6 a broken sectional view illustrating a modified form of my invention.

This invention relates to an improvement in friction clutches, and particularly to clutches of the strap type, that is, a clutch in which a friction coil is employed to bind upon a drum to impart revolution therefrom. These clutches are particularly adapted for use in heavy machinery where it is desired to make such a gradual grip that danger of breakage is avoided, the object of the invention being a simple arrangement of means for accomplishing this purpose and to provide means for instantaneously releasing the clutch so that in case of accident, or for any other reason, machinery may be stopped; and the invention consists in the construction hereinafter described and particularly recited in the claims.

In carrying out my invention I employ a drum 2 keyed to the shaft 3 which is constantly driven. This drum runs in close proximity to a hub 4 which is connected through any suitable mechanism with the mechanism to be driven. Upon the drum and surrounding the same, I place two spiral coils 5 and 6. The ends of these coils are attached to or made a part of the hub 4. The coils preferably grow narrow toward the outer end and are also tapered in thickness and at their outer ends are connected to opposite sides of a coil-head 8 formed with a flange 9. Mounted upon the shaft and secured to the drum 2 is a circular block 10 recessed at regular intervals, and herein shown at three points to receive shoes 11. These shoes are pivoted to the upper ends of links 12 which are mounted upon eccentrics 13 projecting into the block 10 from an operating arm 14 which is pivotally mounted in the block 10. The upper ends of these arms 14 are connected by links 15 with an outer or engaging ring 16, while the inner ends of the arms are connected by links 17 with an inner or releasing ring 18 freely mounted on the shaft 3 and held in place by clamps 19.

Pivotally mounted in a bearing 20 or part of the machine mechanism below the coil-head are two operating levers 21 and 22 which are bowed to pass around the shaft and one is longer than the other, and the outer ends 23 and 24 are pivotally connected to an operating handle 25. These levers are formed respectively with inwardly projecting segmental operating blocks 26 and 27 which extend between the outer ring 16 and the inner ring 18 and in position to be pressed against either ring according to the direction in which the handle is turned. When the handle 25 is in a vertical position, as shown in Fig. 1 of the drawings, the operating blocks are out of engagement with both rings, and the shaft 3 is free to revolve freely and without turning the hub 4. To throw the clutch into operation, the operating handle 25 will be turned to the right which will tend to separate the operating levers 21 and 22 and cause the segmental blocks 26 and 27 to engage with the outer ring 16. This arrests or retards the movement of the ring 16 and through the links 15 turn the operating arms 14 and force the shoes 11 into engagement with the coil-head 8. The coil-head 8 is therefore coupled with the shaft, and as it revolves will gradually wind the coil and cause it to grip the drum 2 and with increasing force, so that when it has frictionally gripped the drum 2 it will impart revolution to the hub 4 which will then continue to turn with the shaft 3.

When it is desired to stop the rotation of the hub 4 the operating handle 25 is moved to the left, which causes the cam blocks 26 and 27 to arrest the movement of the inner or releasing ring 18, and as this ring is connected through the links 17 with the arms 14, those arms are turned in the opposite direction so as to instantaneously release the shoes 11 from engagement with the coil-head 8, thus throwing the coil-head out of connection with the shaft, and hence allowing the coils to expand and move away from the drum 2.

The operation of the clutch might be reversed, and instead of coupling the drum to the hub, the hub might be the driven member and the drum 2 coupled to the shaft by reversing the position of the shoe 11 to the inner circumference of the block 10 so as to be forced downward on the shaft as indicated in Fig. 6, the operation being substantially the same in either case. The reason, and advantage of employing two or more coils and attaching them at regular intervals, or making them a part of it is, that the motion or force is evenly applied so that it will not cause the hub to cramp upon the shaft, and will not throw the adjacent ends of the shaft out of alinement. I do not wish to be understood, however, as limiting my invention as to a double coil as a single or triple coil might be employed.

I claim:—

1. A friction clutch comprising a drum, a coil surrounding the said drum the inner end of the coil connected with a hub, the outer end connected to a coil-head, a block within said head, a series of shoes radially movable in said block, a corresponding series of operating levers formed with eccentrics, links on said eccentrics and pivotally connected with said shoes, an outer ring and an inner ring adjacent to said block, and links connecting the outer ends of said arms with the outer rings, and links connecting the inner ends of the said arms with the inner rings, and means for retarding the motion of either the outer or inner ring.

2. A friction clutch comprising a drum, a coil surrounding the said drum the inner end of the coil connected with a hub, the outer end connected to a coil-head, a block within said head, a series of shoes radially movable in said block against the inner face of said head, a corresponding series of operating levers pivotally mounted in said block and formed with eccentrics, links on said eccentrics and pivotally connected with said shoes, an outer ring and an inner ring adjacent to said block, and links connecting the outer ends of said arms with the outer rings, and links connecting the inner ends of the said arms with the inner rings, and means for retarding the motion of either the outer or inner ring.

3. A friction clutch comprising a drum, a coil surrounding the said drum the inner end of the coil connected with a hub, the outer end connected to a coil-head, a block within said head, a series of shoes radially movable in said block against the inner face of said head, a corresponding series of operating levers pivotally mounted in said block and formed with eccentrics, links on said eccentrics and pivotally connected with said shoes, an outer ring and an inner ring adjacent to said block, links connecting the outer ends of said arms with the outer rings, and links connecting the inner ends of said arms with the inner rings, a pair of operating levers each formed with a segmental operating block extending between the said outer and inner ring and adapted to be thrown into engagement with either.

4. A friction clutch comprising a drum and a hub, two coils mounted on said hub and having their respective ends engaged with opposite sides of said hub, a coil-head secured to the outer end of said coils, a block within said head, a series of shoes mounted in said block and radially movable therein, a corresponding series of operating levers pivotally mounted in said block and each formed with an eccentric, a link connected with said eccentric and with said shoes, an inner and an outer ring, links connecting the outer ends of operating levers with the outer rings and the inner ends of the operating levers with the inner rings, a pair of bowed operating levers pivotally mounted below the said head, said levers connected at their outer ends with an operating handle and each lever carrying a segmental block extending inward between the said rings and adapted to be thrown into engagement with either.

In testimony whereof, I have signed this specification in the presence of two subscribing witnesses.

JOHN W. DEARBORN.

Witnesses:
FREDERIC C. EARLE,
CLARA L. WEED.